(12) United States Patent
Brown et al.

(10) Patent No.: US 9,908,620 B2
(45) Date of Patent: Mar. 6, 2018

(54) MULTI-ZONE ACTIVE LAMINAR FLOW CONTROL SYSTEM FOR AN AIRCRAFT PROPULSION SYSTEM

(71) Applicant: Rohr, Inc., Chula Vista, CA (US)

(72) Inventors: Keith T. Brown, Bonita, CA (US); Stuart J. Byrne, San Diego, CA (US); Steven M. Kestler, Winchester, CT (US)

(73) Assignee: Rohr, Inc., Chula Vista, CA (US)

( * ) Notice: Subject to any disclaimer, the term of this patent is extended or adjusted under 35 U.S.C. 154(b) by 523 days.

(21) Appl. No.: 14/713,621

(22) Filed: May 15, 2015

(65) Prior Publication Data
US 2016/0375988 A1    Dec. 29, 2016

(51) Int. Cl.
*B64D 33/02* (2006.01)
*B64C 21/06* (2006.01)
*B64D 29/00* (2006.01)

(52) U.S. Cl.
CPC .............. *B64C 21/06* (2013.01); *B64D 29/00* (2013.01); *B64D 33/02* (2013.01); *B64D 2033/0226* (2013.01)

(58) Field of Classification Search
CPC ......... B64C 21/00; B64C 21/02; B64C 21/06; B64C 21/08; B64D 29/00
See application file for complete search history.

(56) References Cited

U.S. PATENT DOCUMENTS

| | | | |
|---|---|---|---|
| 4,749,150 A * | 6/1988 | Rose | B64C 21/06 181/214 |
| 4,993,663 A | 2/1991 | Lahti et al. | |
| 5,297,765 A * | 3/1994 | Hughes | B64C 21/06 244/130 |
| 5,743,493 A | 4/1998 | McCaughan | |
| 6,059,524 A | 5/2000 | Costa et al. | |
| 6,752,358 B1 * | 6/2004 | Williams | B64C 1/12 244/208 |
| 6,920,958 B2 | 7/2005 | Harrison | |
| 7,673,832 B2 | 3/2010 | Meister | |
| 7,870,929 B2 | 1/2011 | Farstad | |
| 7,922,126 B2 * | 4/2011 | Meister | B64C 21/025 244/123.12 |
| 8,092,169 B2 * | 1/2012 | Cloft | B64D 33/02 415/182.1 |
| 8,528,318 B2 | 9/2013 | Hendricks | |
| 8,657,567 B2 | 2/2014 | Cloft | |

(Continued)

OTHER PUBLICATIONS

Joslin, "Overview of Laminar Flow Control", Oct. 1998, NASA/TP-1998-208705.

(Continued)

*Primary Examiner* — Richard G Davis
(74) *Attorney, Agent, or Firm* — O'Shea Getz P.C.

(57) ABSTRACT

A nacelle is provided for an aircraft propulsion system. The nacelle may include an outer barrel and an active laminar flow control system. The active laminar flow control system may include a plurality of suction sources and a plurality of arrays of perforations in the outer barrel. The active laminar flow control system may be configured with a plurality of zones. Each of the zones may include a respective one of the suction sources which is fluidly coupled with a respective one of the arrays of perforations in the outer barrel.

14 Claims, 11 Drawing Sheets

(56) References Cited

U.S. PATENT DOCUMENTS

| | | | |
|---|---|---|---|
| 8,777,163 B2 | 7/2014 | Safai | |
| 8,839,805 B2 | 9/2014 | Zysman | |
| 8,844,553 B2 | 9/2014 | Zysman | |
| 2005/0045774 A1* | 3/2005 | Hocking | B64C 21/06 244/209 |
| 2005/0151026 A1* | 7/2005 | Meyer | B64D 33/02 244/204 |
| 2010/0294892 A1* | 11/2010 | Syassen | B64C 21/06 244/209 |
| 2016/0332724 A1* | 11/2016 | Mehring | F28F 13/003 |

OTHER PUBLICATIONS

Joslin, "Aircraft Laminar Flow Control", Annual Review of Fluid Mechanics, 1998: vol. 31: 1-29.
Washburn, "Drag Reduction Status and Plans—Laminar Flow and AFC", Jan. 4-7, 2011, AIAA Aero Sciences Meeting.
European Commission, "Hybrid Laminar Flow Technology (HYLTEC)", Jan. 1, 1998.
John E. Green, "Laminar Flow Control—Back to the Future?", 38th Fluid Dynamics Conference and Exhibit, Jun. 23-26, 2008, AIAA 2008-3738.
Chambers, "Innovation in Flight", NASA SP-2005-4539, Aug. 22, 2005.
Braslow, "A History of Suction-Type Laminar-Flow Control with Emphasis on Flight Research", Monographs in Aerospace History #13, 1999.
EP search report for EP16170020.8 dated Sep. 15, 2016.

* cited by examiner

MULTI-ZONE ACTIVE LAMINAR FLOW CONTROL SYSTEM FOR AN AIRCRAFT PROPULSION SYSTEM

BACKGROUND OF THE INVENTION

1. Technical Field

This disclosure relates generally to an aircraft propulsion system and, more particularly, to a nacelle for an aircraft propulsion system and promoting laminar flow next to the nacelle.

2. Background Information

Achieving laminar flow over an aircraft aerodynamic surface, such as an outer surface of a nacelle, has been a goal for many decades because, in general, laminar flow over an aerodynamic surface results in reduced drag compared to turbulent flow over the same surface. Two strategies include natural laminar flow and active laminar flow control.

Natural laminar flow (NLF) may be provided by shaping the aerodynamic surface in a manner such that laminar flow naturally occurs and is maintained along at least a portion of the aerodynamic surface during all or during targeted flight conditions. Natural laminar flow is advantageous because it does not require any additional hardware or controls. However, there are practical limits to how much laminar flow area can be achieved around the exterior of a propulsion system nacelle.

Active laminar flow control (ALFC) involves modifying airflow over an aerodynamic surface so that laminar flow, which occurs over the leading edge, is maintained over at least a portion of the surface by preventing a trip to turbulent flow. The modification to the air flow for active laminar flow control can take different forms, one of which involves continuously removing low energy air from a boundary layer along the extent of the flow surface to prevent the boundary layer from thickening and eventually tripping to turbulent flow. This has been proposed by using many small holes closely spaced and generally evenly distributed along and across the flow surface with suction to pull air from the boundary layer into the holes in a generally continuous fashion.

While active laminar flow control through removal of the boundary layer air is generally known in the art, it has not been commercially implemented due to several problems.

There is a need in the art therefore for an active laminar flow control system which may be commercially implemented with a nacelle of an aircraft propulsion system.

SUMMARY OF THE DISCLOSURE

According to an aspect of the invention, a nacelle is provided for an aircraft propulsion system. This nacelle includes an outer barrel and an active laminar flow control system. The active laminar flow control system includes a plurality of suction sources and a plurality of arrays of perforations in the outer barrel. The active laminar flow control system is configured with a plurality of zones. Each of the zones includes a respective one of the suction sources which is fluidly coupled with a respective one of the arrays of perforations in the outer barrel.

According to another aspect of the invention, another nacelle is provided for an aircraft propulsion system. This nacelle includes an outer barrel and an active laminar flow control system. The active laminar flow control system includes a plurality of arrays of perforations in the outer barrel. The active laminar flow control system is configured with a plurality of zones. Each of the zones is configured to independently regulate airflow through a respective one of the arrays of perforations in the outer barrel.

According to another aspect of the invention, an assembly is provided for an aircraft propulsion system. This assembly includes a nacelle, which includes an active laminar flow control system configured with a plurality of zones. Each of the zones is configured to independently regulate airflow through respective perforations in the nacelle.

According to another aspect of the invention, another nacelle is provided for an aircraft propulsion system. This nacelle includes a nacelle inlet and an active laminar flow control system. The active laminar flow control system is configured to regulate airflow through perforations in the nacelle inlet. The active laminar flow control system is configured with the nacelle inlet such that the nacelle inlet and the active laminar flow control system are operable to be connected or disconnected from another component of the aircraft propulsion system as a single unit.

According to another aspect of the invention, another nacelle is provided for an aircraft propulsion system. This nacelle includes a nacelle inlet and an active laminar flow control system. The active laminar flow control system is configured to regulate airflow through perforations in the nacelle inlet. The active laminar flow control system includes at least one suction source housed within the nacelle inlet.

According to another aspect of the invention, another nacelle is provided for an aircraft propulsion system. This nacelle includes a nacelle inlet and an active laminar flow control system. The active laminar flow control system is configured to regulate airflow through perforations in the nacelle inlet. The active laminar flow control system includes at least one suction source mounted to the nacelle inlet.

The active laminar flow control system may include a plurality of electric suction sources. Each of the zones may include a respective one of the suction sources which is fluidly coupled with a respective one of the arrays of perforations in the outer barrel.

The arrays of perforations in the outer barrel may include a first array and a second array. The first and the second arrays may be arranged circumferentially about an axis of the outer barrel.

The first and the second arrays are generally aligned along the axis.

The arrays of perforations in the outer barrel may include a first array and a second array. The first and the second arrays may be arranged along an axis of the outer barrel.

The first and the second arrays may be generally aligned circumferentially about the axis.

A first of the zones may include a plurality of plenums fluidly coupled with and between a first of the arrays of perforations in the outer barrel and a first of the suction sources.

The plenums may be arranged along an axis of the outer barrel.

A forward bulkhead and/or an aft bulkhead may be included. A first of the plenums may be arranged axially forward of the aft bulkhead. In addition or alternatively, a second of the plenums may be arranged axially aft of the aft bulkhead.

A forward bulkhead and/or an aft bulkhead may be included. A first of the zones may include a plenum fluidly coupled with and between a first of the arrays of perforations in the outer barrel and a first of the suction sources. The plenum may be aft of the aft bulkhead.

A first of the suction sources may be configured as or otherwise include an electric pump.

A nacelle inlet may be included which includes the outer barrel. The active laminar flow control system may be configured with the nacelle inlet.

A nacelle inlet may be included which includes the outer barrel. A first of the suction sources may be housed within the nacelle inlet. In addition or alternatively, the first of the suction sources may be mounted to the nacelle inlet.

The outer barrel and the active laminar flow control system may be operable to be connected to or disconnected from another component of the aircraft propulsion system as a single unit.

The foregoing features and the operation of the invention will become more apparent in light of the following description and the accompanying drawings.

DETAILED DESCRIPTION OF THE INVENTION

Figure 1:
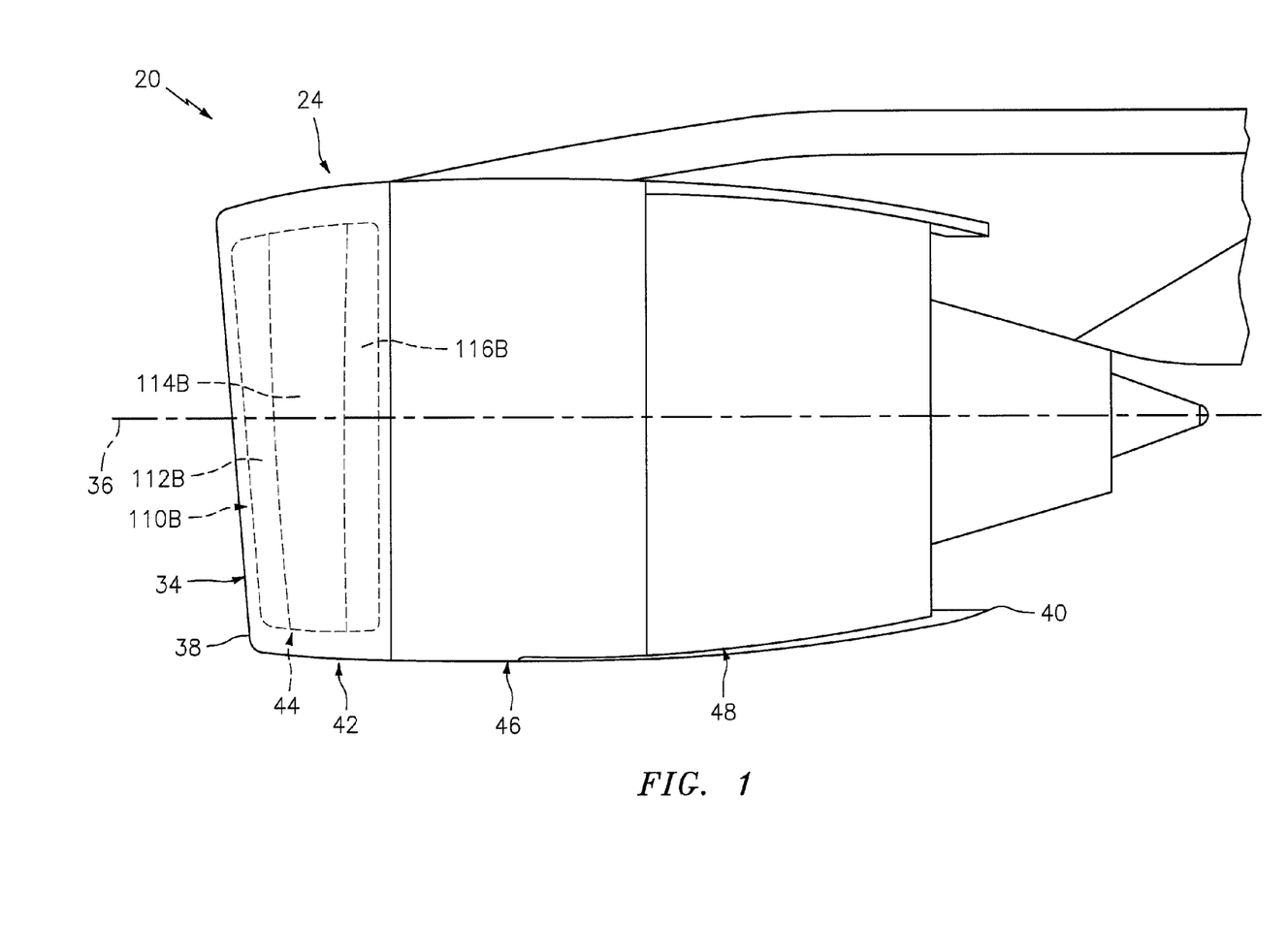
FIG. 1 is a side view illustration of an aircraft propulsion system.
Figure 2:
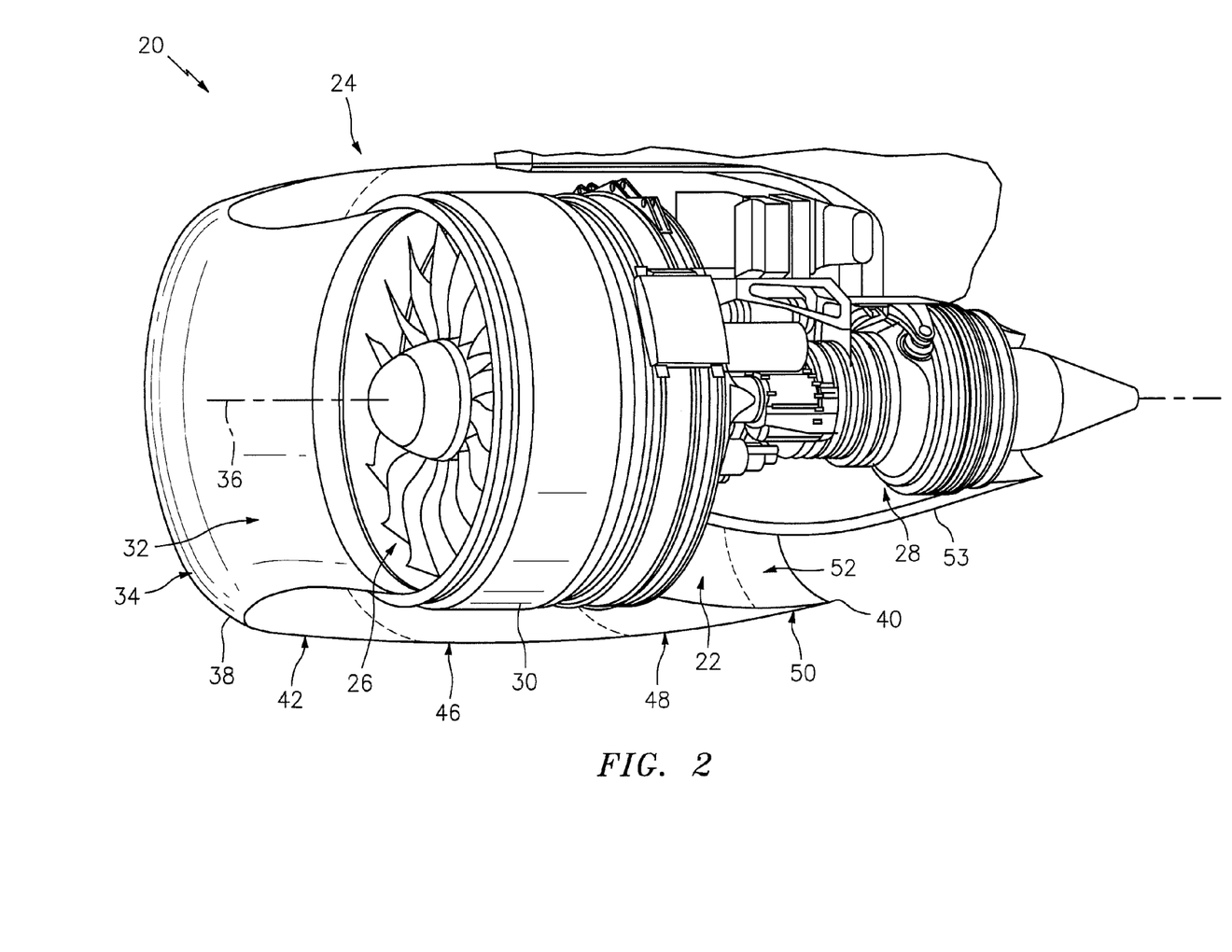
FIG. 2 is a perspective side cutaway illustration of the aircraft propulsion system.

FIGS. 1 and 2 illustrate an aircraft propulsion system 20 that includes a gas turbine engine 22 housed within a nacelle 24. The turbine engine 22 may be configured as a turbofan engine. The turbine engine 22 of FIG. 2, for example, includes a bypass fan 26 and an engine core 28, which may include low and high pressure compressors, a combustor and high and low pressure turbines.

The fan 26 is configured with an array of fan blades. These fan blades are housed within a tubular fan case 30. The fan case 30 is configured to provide an outer boundary for an axial portion of a gas path 32 extending into the propulsion system 20 from an inlet orifice 34 and through the fan 26. The fan case 30 may also be configured to radially contain one or more of the fan blades and/or fan blade fragments where the blade(s) and/or blade fragment(s) are radially ejected from the fan rotor, for example, after collision with a foreign object.

The nacelle 24 extends along an axis 36 between a nacelle forward end 38 and a nacelle aft end 40. The nacelle 24 includes a nacelle inlet 42 configured with an active laminar flow control (ALFC) system 44; see also FIG. 3. The nacelle 24 also includes a fan cowl 46 and a thrust reverser 48. The components 42, 46 and 48 are arranged sequentially along the axis 36 with the nacelle inlet 42 at the nacelle forward end 38 and with the thrust reverser 48 generally at the nacelle aft end 40. The fan cowl 46 is generally axially aligned with the fan 26 and axially overlaps the fan case 30.

The nacelle inlet 42 is configured to direct a stream of air through the inlet orifice 34 and into the turbine engine 22. More particularly, the nacelle inlet 42 is configured to provide a bifurcation between (A) air flowing into the gas path 32 through the inlet orifice 34 and (B) air flowing around and outside of the propulsion system 20. The nacelle inlet 42 may also be configured to create and/or maintain laminar flow of the air flowing outside and adjacent to the nacelle 24 as described below in further detail. By promoting and/or extending laminar flow, the nacelle inlet 42 may reduce aerodynamic drag and increase propulsion system 20 efficiency.

Figure 3:
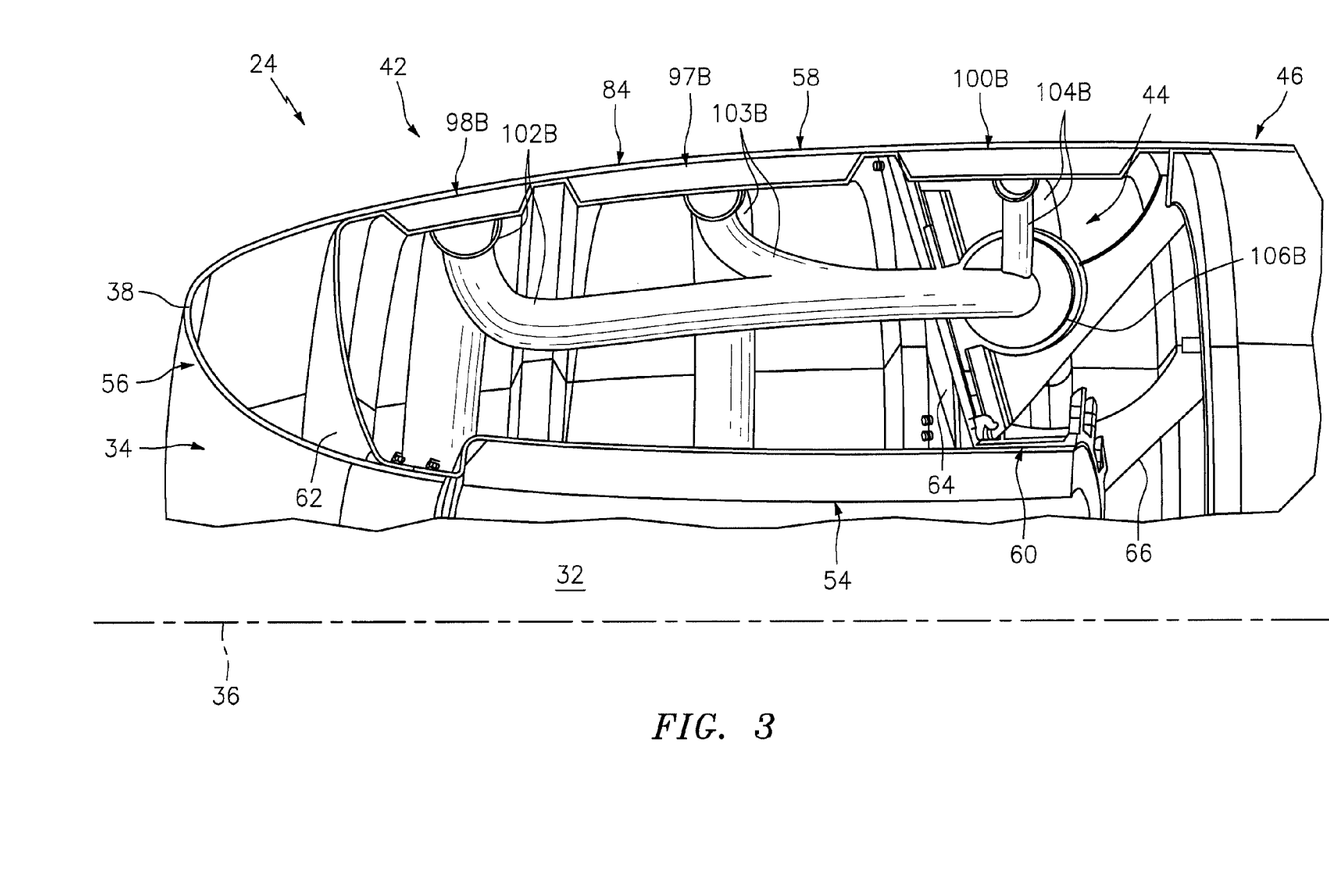
FIG. 3 is a perspective side sectional illustration of a forward portion of a nacelle configured with an active laminar flow control (ALFC) system.
Figure 4:
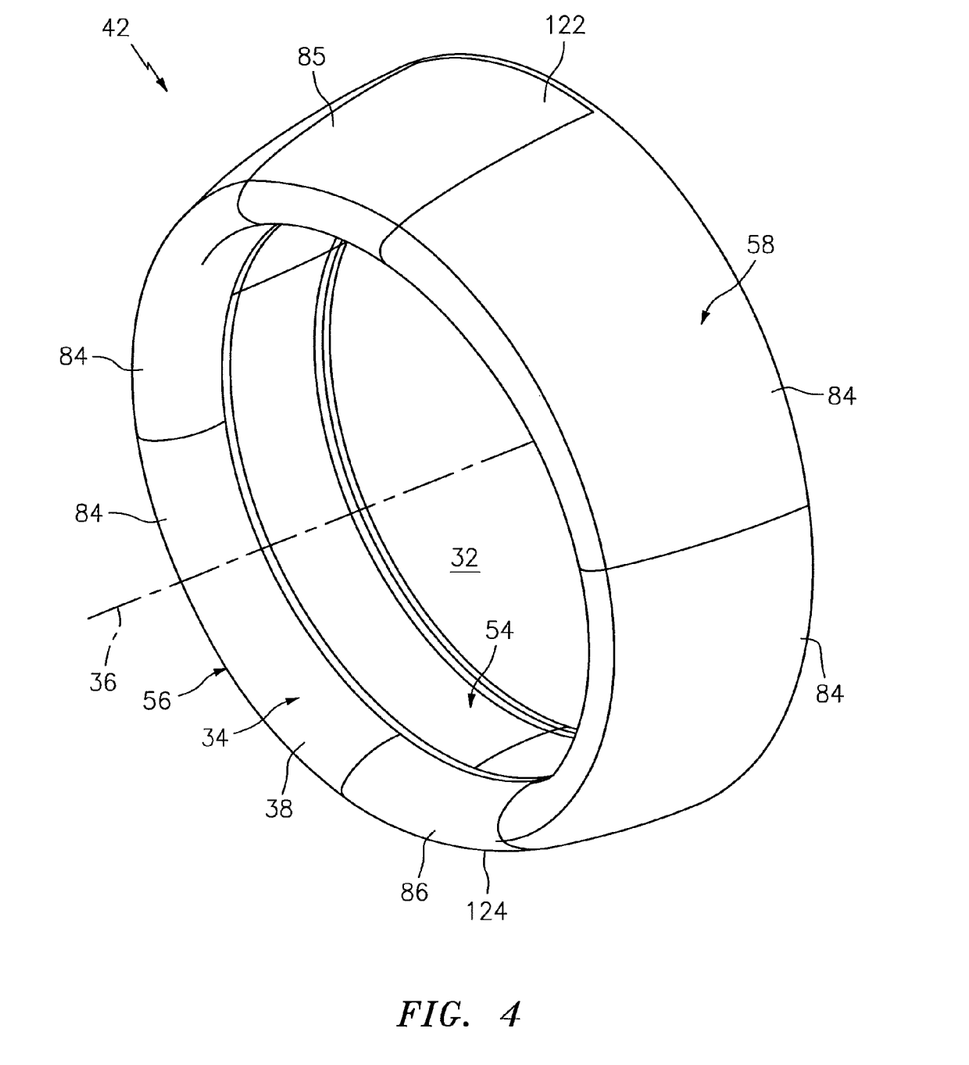
FIG. 4 is a perspective illustration of a nacelle inlet for the aircraft propulsion system.
Figure 5:
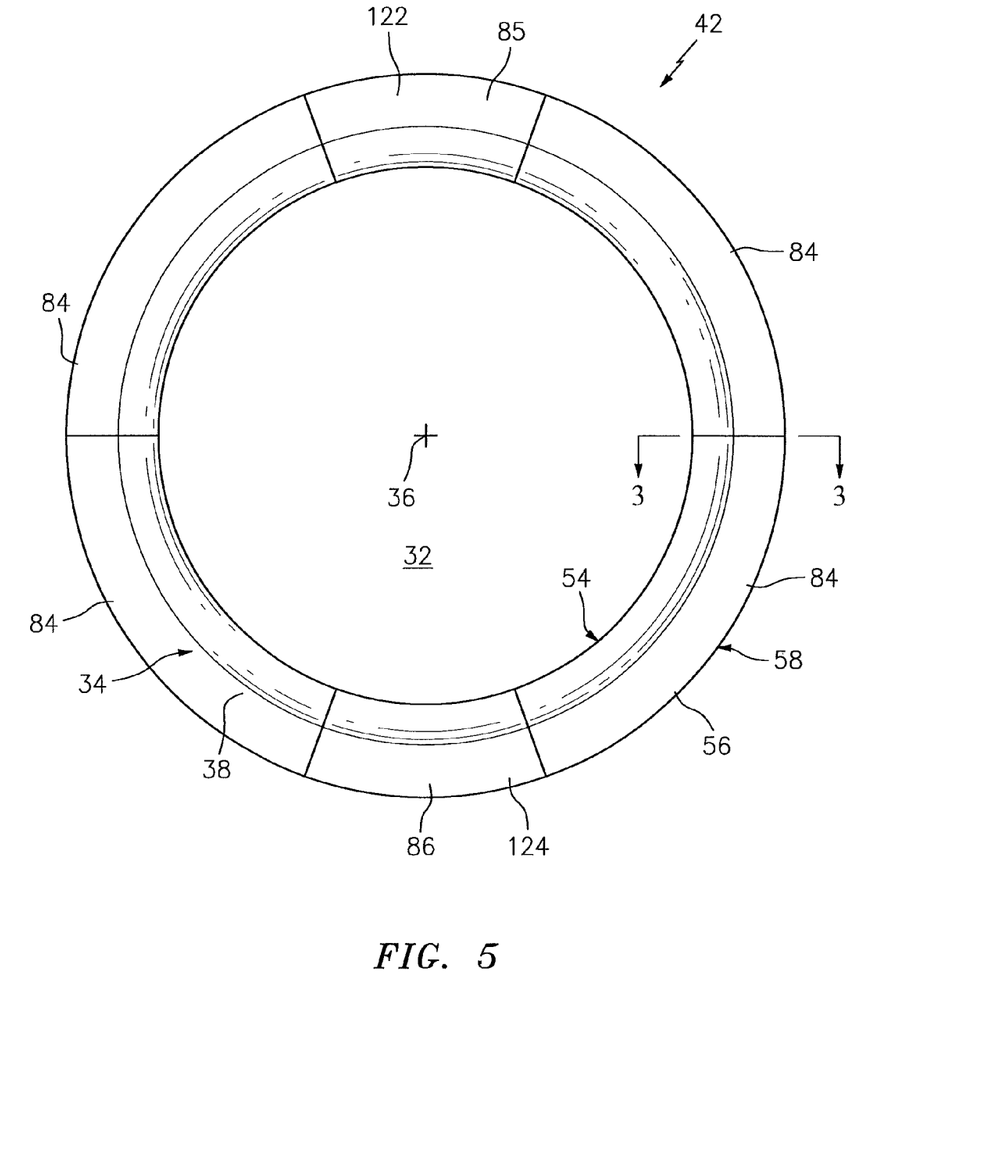
FIG. 5 is a front view illustration of the nacelle inlet.

Referring to FIGS. 3-5, the nacelle inlet 42 includes a tubular acoustic inner barrel 54, an annular inlet lip 56 and a tubular outer barrel 58. The nacelle inlet 42 may also include a fan case attachment ring 60, one or more bulkheads 62 and 64 and one or more outer barrel supports 66.

Figure 6:
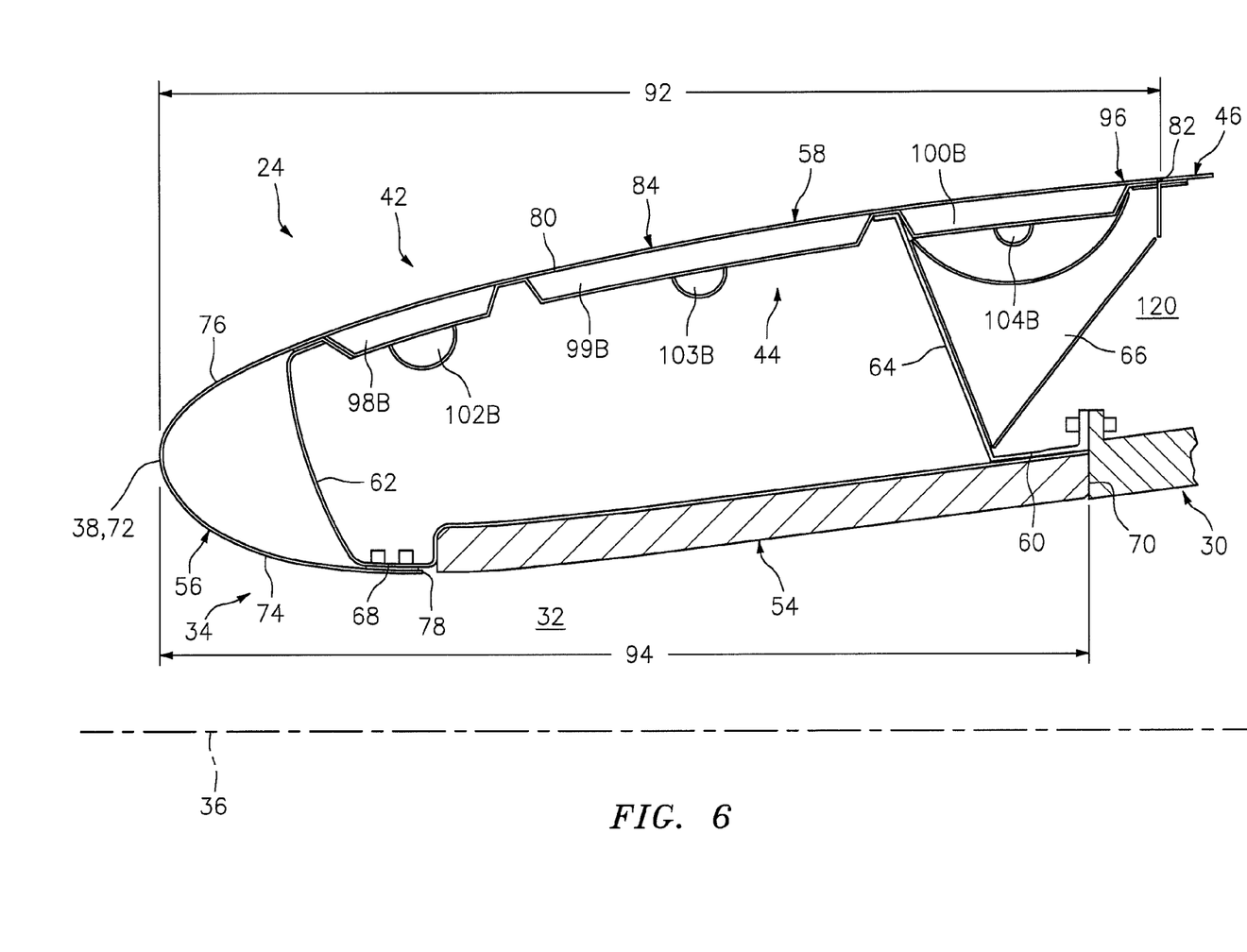
FIG. 6 is a side sectional illustration of another forward portion of the nacelle.

Referring to FIG. 6, the inner barrel 54 extends circumferentially around the axis 36. The inner barrel 54 extends axially along the axis 36 between an inner barrel forward end 68 and an inner barrel aft end 70.

The inner barrel 54 is configured to attenuate noise generated during propulsion system 20 operation and, more particularly for example, noise generated by rotation of the fan 26. The inner barrel 54, for example, may include at least one tubular acoustic panel or an array of arcuate acoustic panels arranged around the axis 36. Each acoustic panel may include a porous (e.g., honeycomb) core bonded between a perforated face sheet and a non-perforated back sheet, where the perforated face sheet faces radially inward and provides an outer boundary for an axial portion of the gas path 32. Of course, various other acoustic panel types and configurations are known in the art, and the present disclosure is not limited to any particular ones thereof.

The inlet lip 56 forms a leading edge 72 of the nacelle 24 as well as the inlet orifice 34 to the gas path 32. The inlet lip 56 has a cupped (e.g., a generally U-shaped or V-shaped) cross-sectional geometry which extends circumferentially around the axis 36. The inlet lip 56 includes axially overlapping inner and outer lip portions 74 and 76.

The inner lip portion 74 extends axially from the outer lip portion 76 at the nacelle forward end 38 and the inlet orifice 34 to the inner barrel 54. An aft end 78 of the inner lip portion 74 is attached to the inner barrel forward end 68 with, for example, one or more fasteners; e.g., rivets, bolts, etc. The inner lip portion 74 may also or alternatively be bonded (e.g., welded, brazed, adhered, etc.) to the inner barrel 54. Of course, the present disclosure is not limited to any particular attachment techniques between the inlet lip 56 and the inner barrel 54.

The outer lip portion 76 extends axially from the inner lip portion 74 at the nacelle forward end 38 to the outer barrel 58. The outer lip portion 76 and, more particular, the entire inlet lip 56 may be formed integral with the outer barrel 58. The inlet lip 56 and the outer barrel 58, for example, may be formed from a monolithic outer skin 80 such as, for example, a formed piece of sheet metal or molded composite material; e.g., fiber reinforcement within a polymer matrix. Such a monolithic outer skin 80 may extend longitudinally from the aft end 78 of the inner lip portion 74 to an aft end 82 of the outer barrel 58.

Figure 7:
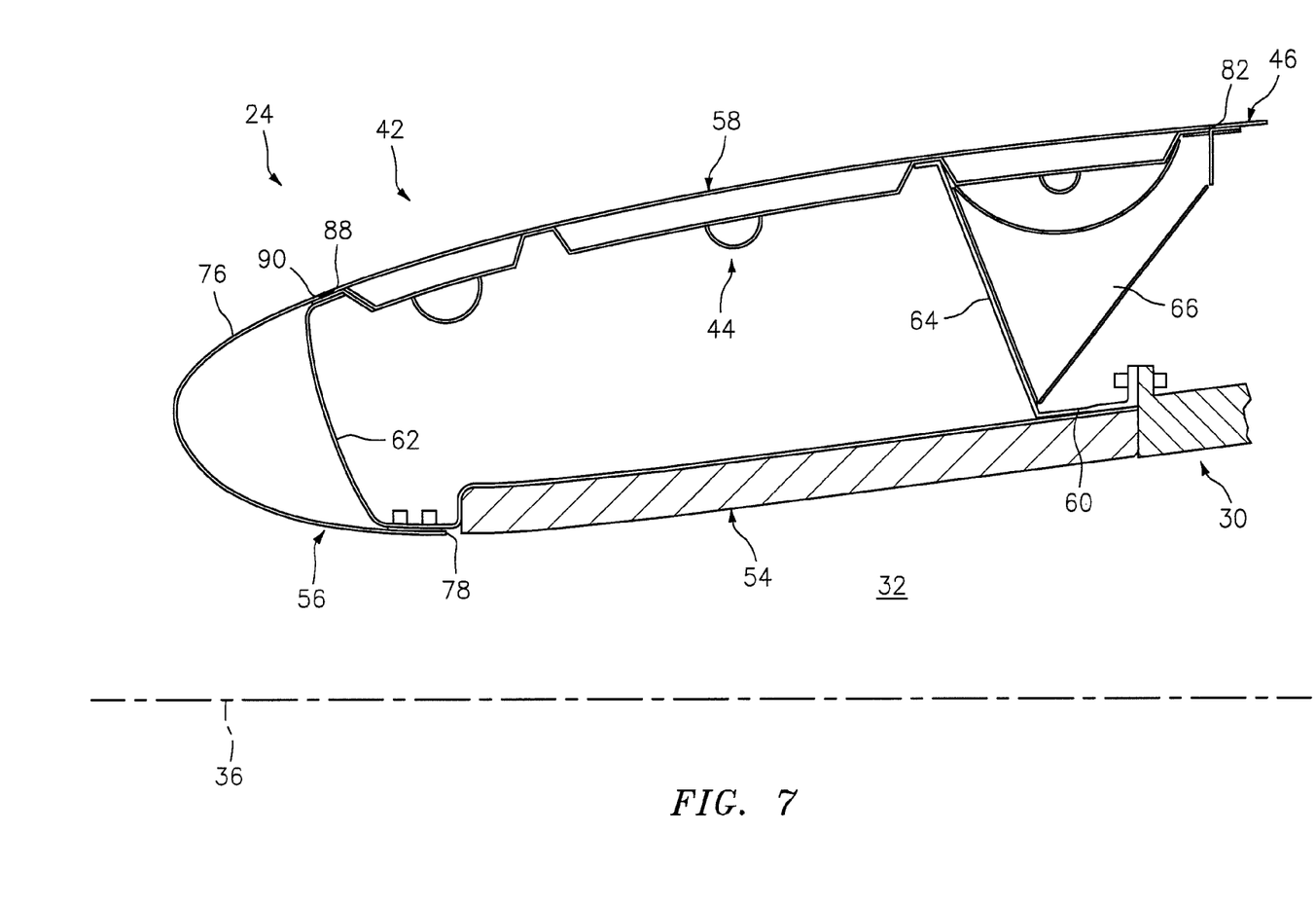
FIG. 7 is a side sectional illustration of a forward portion of another nacelle.

The inlet lip 56 and the outer barrel 58 may be configured as a single monolithic full hoop body. Alternatively, the inlet lip 56 and the outer barrel 58 may be fowled from an array of arcuate segments 84-86 that are attached side-to-side circumferentially about the axis 36 as shown in FIGS. 4 and 5. In other embodiments, however, the inlet lip 56 may be formed discrete from the outer barrel 58 as shown in FIG. 7. In such an embodiment, an aft end 88 of the outer lip portion 76 is attached (e.g., mechanically fastened and/or bonded) to a forward end 90 of the outer barrel 58.

Figure 8:
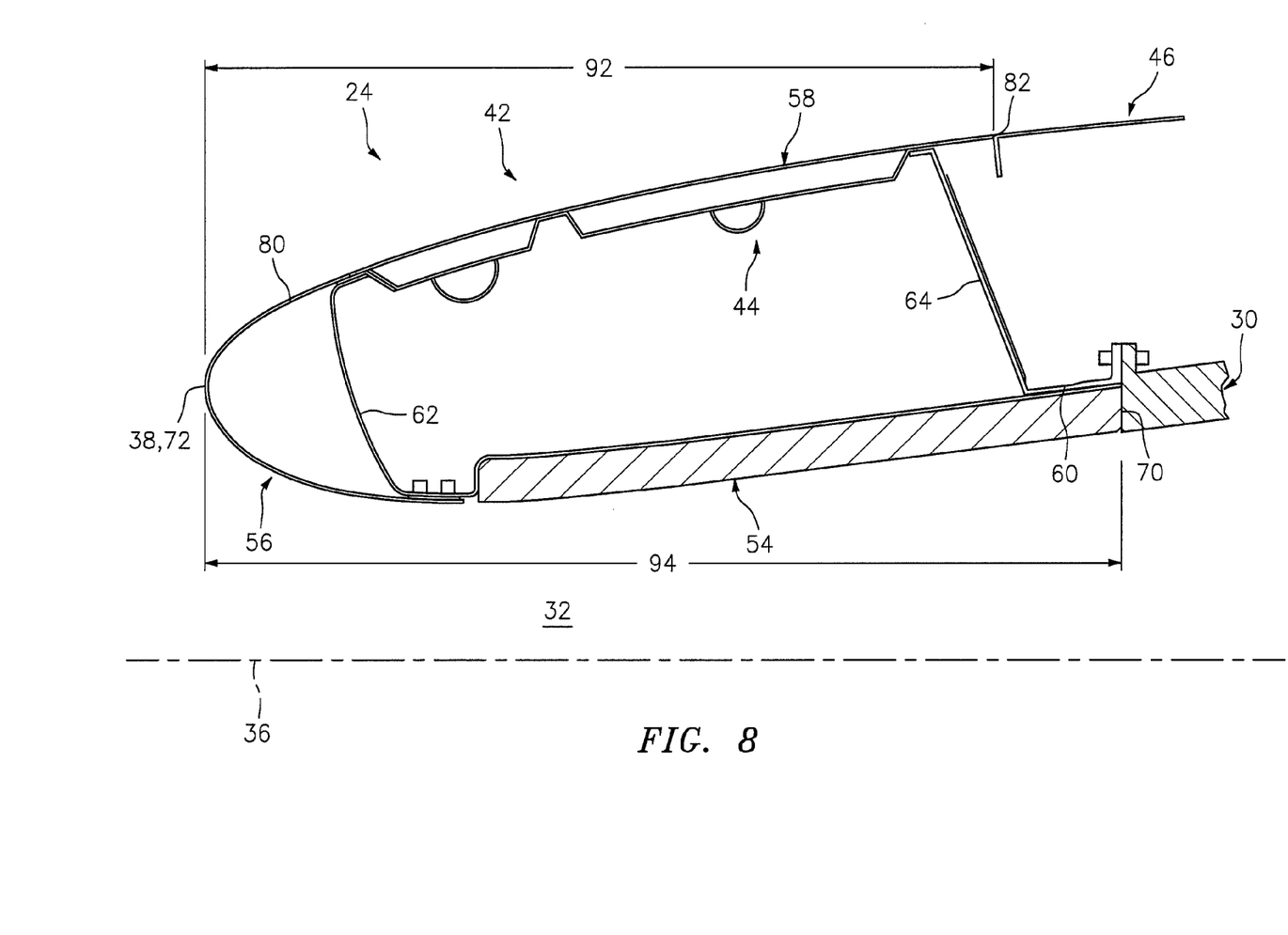
FIG. 8 is a side sectional illustration of a forward portion of another nacelle.

Referring again to FIG. 6, the outer barrel 58 extends circumferentially around the axis 36. The outer barrel 58 extends axially along the axis 36 between the inlet lip 56 and, more particularly, the outer lip portion 76 and the outer barrel aft end 82. The outer barrel 58 may be sized to axially project aft away from the inner barrel 54 and the attachment ring 60, which is attached to the inner barrel 54 at its aft end 70. More particularly, an axial length 92 between the nacelle forward end 38 and the outer barrel aft end 82 is greater than an axial length 94 between the nacelle forward end 38 and inner barrel aft end 70. In other embodiments, however, the axial length 92 may be sized less than the axial length 94 as shown in FIG. 8. In such an embodiment, the nacelle inlet 42 may or may not be configured without one or more or all of the supports 66.

Referring again to FIG. 6, the attachment ring 60 may be configured as a substantially annular body. The attachment ring 60 is located approximately axially at the inner barrel aft end 70. The attachment ring 60 is configured to provide a structural mounting joint between the inner barrel 54 and the fan case 30. The inner barrel 54 may be mounted to a forward portion of the attachment ring 60 and the fan case 30 may be mounted to an aft portion of the attachment ring 60. With this configuration, an aft portion 96 of the outer barrel 58 axially overlaps a forward portion of the fan case 30; however, nacelle 24 of the present disclosure is not limited to such a configuration as indicated above.

The forward bulkhead 62 is located approximately axially at (e.g., proximate, adjacent or on) the aft end 78 of the inlet lip 56. The forward bulkhead 62 may be configured as a substantially annular body. The forward bulkhead 62 is attached to and extends radially between the inner lip portion 74 and the outer lip portion 76. The forward bulkhead 62 may be mechanically fastened to the inlet lip 56 with one or more fasteners. The forward bulkhead 62 may also or alternatively be bonded to the inlet lip 56.

The aft bulkhead 64 is located approximately axially at the inner barrel aft end 70. The aft bulkhead 64 may be configured as a substantially annular body. The aft bulkhead 64 is attached to and extends radially between the outer barrel 58 and the inner barrel 54 and, more particularly, the attachment ring 60 which circumscribes and to which the inner barrel 54 is mounted as described above. The aft bulkhead 64 may be mechanically fastened to one or more of the components 54 and 60 with one or more fasteners. The aft bulkhead 64 may also or alternatively be bonded to one or more of the components 54 and 60.

The aft portion 96 of the outer barrel 58, which axially overlaps the fan case 30, is cantilevered from the aft bulkhead 64. To provide (e.g., radial) structural support for and/or further stiffen this cantilevered aft portion 96 of the outer barrel 58, the supports 66 are provided. These supports 66 are arranged circumferentially around the axis 36 in a circumferential array. Each of the supports 66 may be configured as a gusset, which is mounted to and extends between the aft bulkhead 64 and the aft portion 96 of the outer barrel 58. Each of the supports 66 may axially engage the aft bulkhead 64 along its radial length. Each of the supports 66 may radially engage the aft portion 96 of the outer barrel 58 along its radial length; e.g., approximately from the aft bulkhead 64 to the outer barrel aft end 82. Each of the supports 66 may also be attached to the attachment ring 60. The supports 66 of the present disclosure, however, are not limited to having the foregoing exemplary configuration. Furthermore, as set forth above, one or more or all of the supports 66 may be omitted in alternative embodiments.

Figure 9:
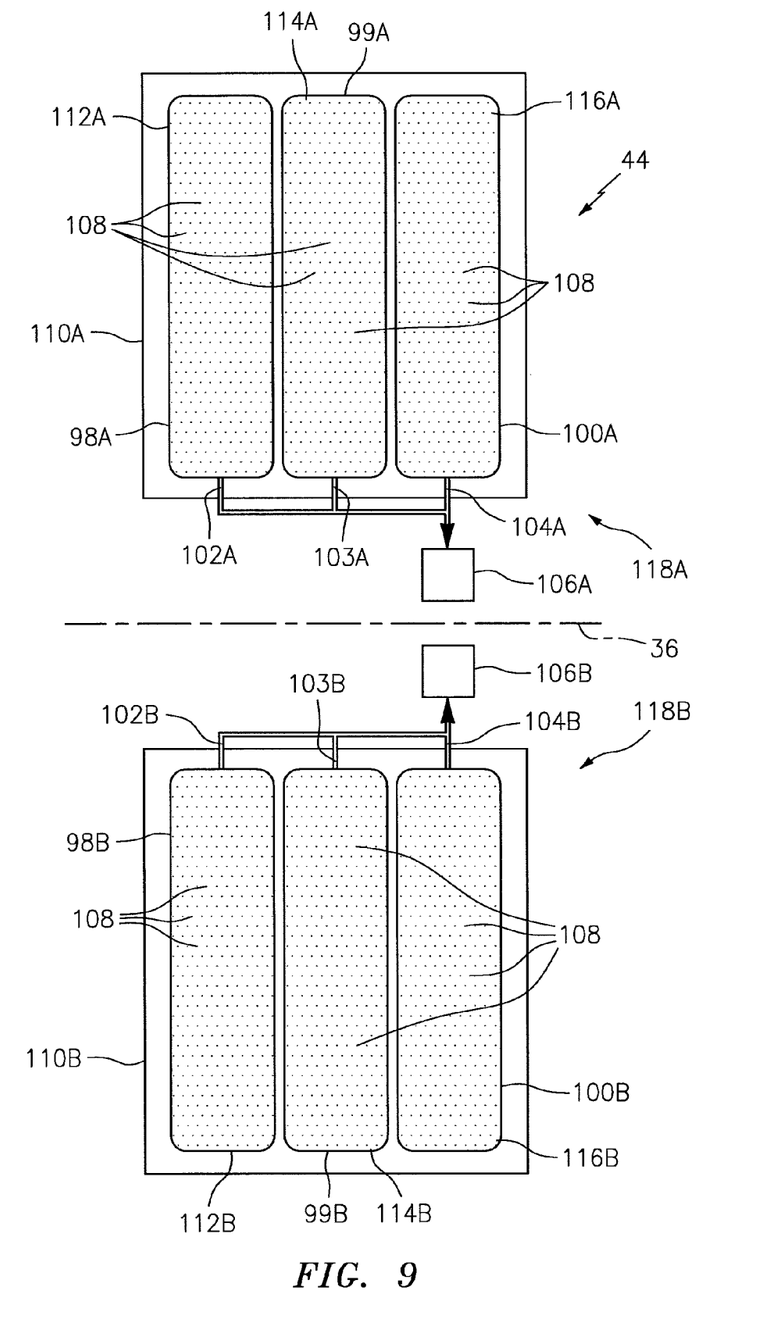
FIG. 9 is a block diagram illustration of the forward portion of the nacelle configured with the ALFC system.

Referring to FIGS. 3 and 9, the active laminar flow control (ALFC) system 44 includes one or more plenums 98A-100A, 98B-100B, one or more conduits 102A-104A, 102B-104B and one or more suction sources 106A, 106B. The ALFC system 44 also includes a plurality of perforations 108 in the nacelle 24 and, more particularly for example, in the outer barrel 58.

Figure 10:
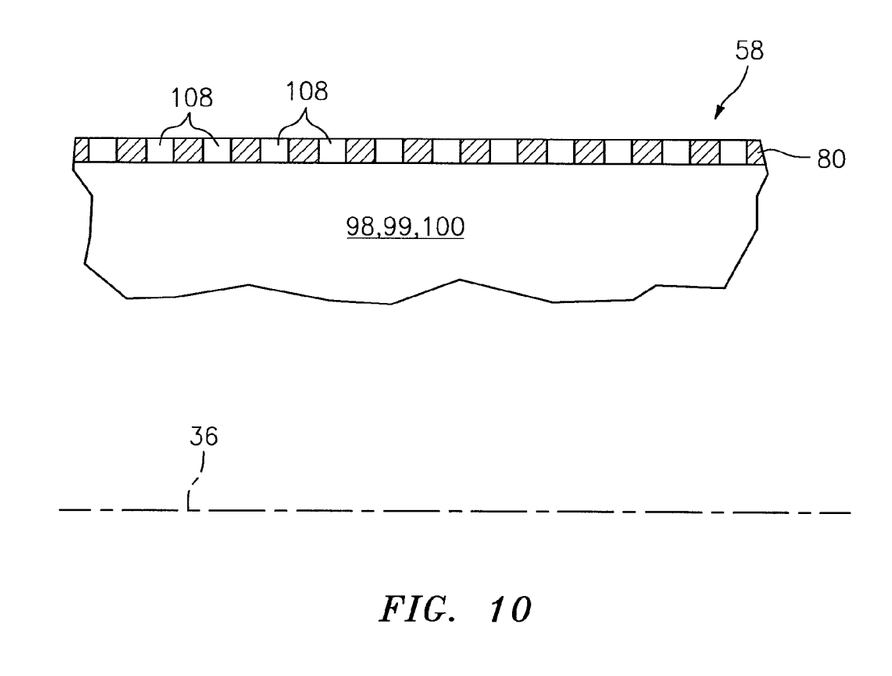
FIG. 10 is a side sectional illustration of a portion of the nacelle.

The perforations 108 extend through the outer skin 80 of the outer barrel 58 as shown in FIG. 10. The perforations 108 may be arranged into one or more arrays 110A, 110B as shown in FIG. 1, where a first of the arrays 110B is on the illustrated front side of the nacelle 24 and a second of the arrays 110A is on the hidden back side of the nacelle 24. The perforations 108 in each of these arrays 110A and 110B may be further arranged into one or more subarrays. Each array 110A, 110B of perforations 108 in FIG. 1, for example, includes a forward subarray 112A, 112B of perforations 108, an intermediate subarray 114A, 114B of perforations 108 and an aft subarray 116A, 116B of perforations 108.

Referring to FIG. 9, the elements of the ALFC system 44 may be configured to provide one or more active laminar flow control (ALFC) zones 118A and 118B; e.g., circumferential zones. Each of these zones 118A, 118B is configured to independently regulate airflow through a respective array 110A, 110B of perforations 108. Each of the zones 118A, 118B, for example, includes at least one of the arrays 110A, 110B of perforations 108, one or more of the plenums 98A-100A, 98B-100B, one of more of the conduits 102A-104A, 102B-104B and at least one of the suction sources 106A, 106B.

Each of the plenums 98A-100A, 98B-100B may be configured as a duct with, for example, one side thereof configured as a respective portion of the perforated outer skin 80. Each of the plenums 98A-100A, 98B-100B is thereby fluidly coupled with a plurality of the perforations 108 (see FIG. 10) in the outer barrel 58. In particular, the first plenums 98A, 98B are fluidly coupled with the forward subarrays 112A, 112B, respectively, of perforations 108. The second plenums 99A, 99B are fluidly coupled with the intermediate subarrays 114A, 114B, respectively, of perforations 108. The third plenums 100A, 100B are fluidly coupled with the aft subarrays 116A, 116B, respectively, of perforations 108. Referring to FIG. 6, the first and the second plenums 98A and 99A, 98B and 99B are located axially between the forward bulkhead 62 and the aft bulkhead 64, with the first plenum 98A, 98B axially forward of the second plenum 99A, 99B. The third plenum 100A, 100B is located axially between the aft bulkhead 64 and the aft end 82.

Referring to FIG. 9, the plenums 98A-100A, 98B-100B are respectively fluidly coupled with the suction source 106A, 106B through the conduits 102A-104A, 102B-104B. Each suction source 106A, 106B may be configured as a pump or a vacuum with an electric motor; e.g., an electric pump. Each suction source 106A, 106B is operable to draw boundary layer air flowing along the outer barrel 58 into the ALFC system 44 so as to actively promote laminar flow adjacent the nacelle 24. More particularly, each suction source 106A, 106B is configured to draw boundary layer air flowing along the outer barrel 58 into the plenums through the array 110A, 110B of perforations 108. The air within the plenums 98A-100A, 98B-100B is then drawn into the suction source 106A, 106B through the conduits 102A-104A, 102B-104B, and is discharged from the suction source 106A, 106B through at least one outlet. This outlet may be fluidly coupled with a nacelle cavity 120 aft of the aft bulkhead 64; see FIG. 6. Alternatively, the outlet may route the discharged air to another cavity within the nacelle 24 and/or to a gas path (e.g., 32, 52; see FIG. 2) within the propulsion system 20 and/or an exterior of the propulsion system 20 via an exterior nacelle vent.

Referring to FIG. 3, in some embodiments, the ALFC system 44 and its elements (e.g., plenums, conduits and suction sources) may all be configured to be mounted to and supported by the nacelle inlet 42, so that the inlet 42 and the ALFC system 44 form a single unit. With such a configuration, the nacelle inlet 42 and the ALFC system 44 may be connected to or disconnected from the engine (the inlet is traditionally supported from and attached to the fan case of the engine) of the aircraft propulsion system 20 as a single unit during, for example, system assembly and/or maintenance. This can simplify assembly and/or maintenance as well as reduce associated costs. The only connection needed between the ALFC system 44 and the remainder of the propulsion system 20 may be an electrical power connection and electrical control connections. No ducting may be needed to cross the boundary between the inlet 42 and other components.

In some embodiments, the nacelle inlet 42 and the ALFC system 44 may be configured to slide forward in order to provide access to certain portions of the propulsion system 20. In other embodiments, the nacelle inlet 42 may be configured with the fan cowl 46 as a single unit. In such an embodiment, the nacelle inlet 42 and the fan cowl 46 may be configured to translate in order to provide access to certain interior portions of the propulsion system 20. Alternatively, the nacelle inlet 42 and the fan cowl 46 may have a clam shell configuration such that a portion of the nacelle inlet 42 and a portion of the fan cowl 46 are integrally configured into a respective door which swings radially outward to provide access to certain interior portions of the propulsion system 20. Each of the doors may be configured with its own ALFC system 44. Thus, the respective ALFC system 44 may not require any ductwork connections with the remainder of the propulsion system 20; e.g., only electrical and/or controller connections. Of course, various other nacelle configurations are possible and contemplated.

Configuring each zone 118A, 118B with its own suction source 106A, 106B also may reduce demand on that suction source 106A, 106B and enable more steady state suction through the perforations 108. In addition, the suction sources 106A, 106B may be individually controlled so as to tune each zone for optimal efficiency. One side of the nacelle inlet 42, for example, may require more suction than the other side of the nacelle inlet 42 to promote laminar flow. The nacelle 24 of the present disclosure, however, is not limited to such a single unit/modular configuration. For example, in other embodiments, one or more of the elements (e.g., plenums, conduits and/or suction sources) may be disposed discrete from the nacelle inlet 42.

Figure 11:
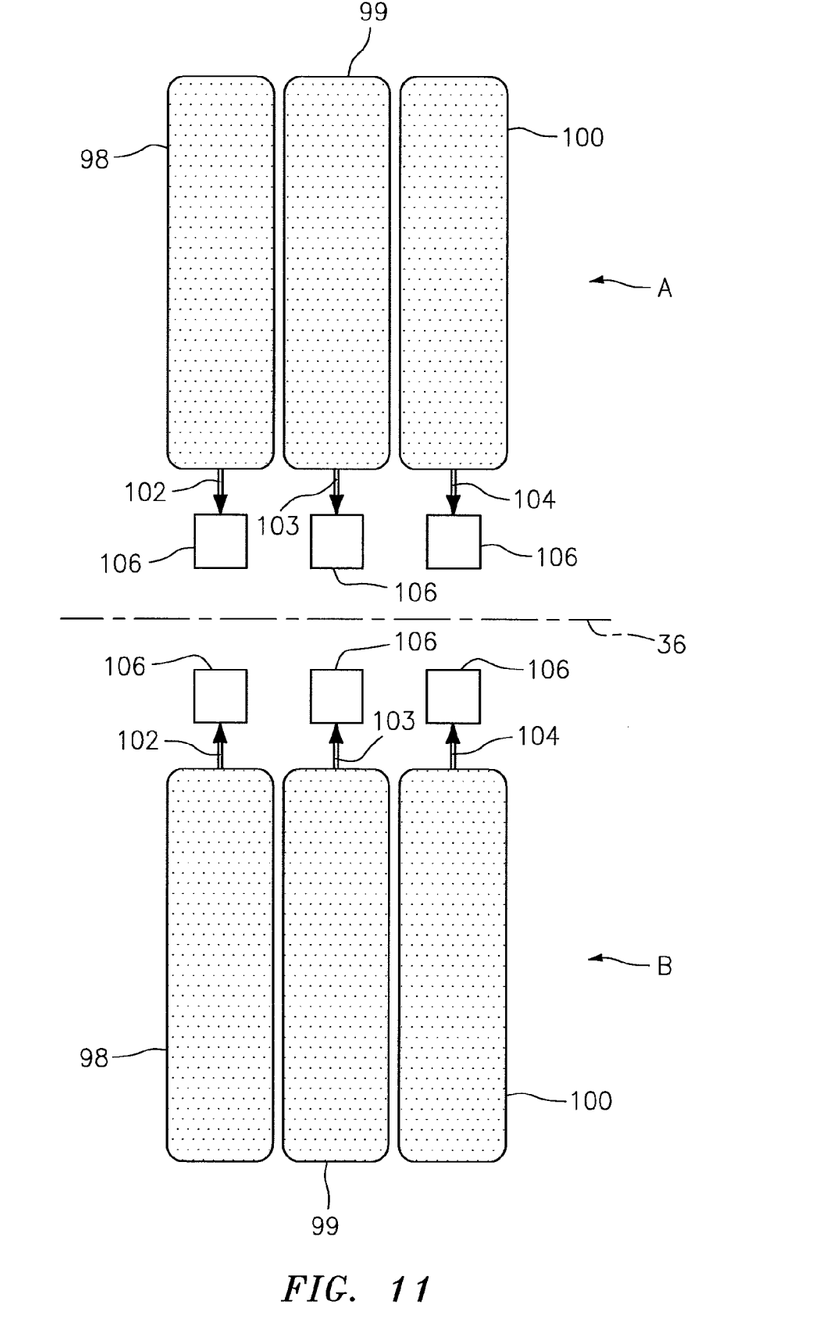
FIG. 11 is a block diagram illustration of the forward portion of the nacelle configured with another ALFC system.

Referring to FIG. 11, in some embodiments, one or more of the plenums 98-100 may be fluidly coupled to its own respective suction source 106. The first plenum 98 of FIG. 11, for example, is fluidly coupled to the suction source 106. The second plenum 99 is fluidly coupled with the suction source 106. The third plenum 100 is fluidly coupled with the suction source 106. Such a configuration can enable more control over the airflow through each subarray of perforations 108 for further optimized efficiency.

Referring to FIGS. 4 and 5, in some embodiments, the outer barrel 58 may include one or more non-perforated regions 122 and 124. The first non-perforated region 122 may be located at a top side of the nacelle 24 which is circumferentially aligned with and forward of an engine pylon. The second non-perforated region 124 may be located at a bottom side of the nacelle 24 which is circumferentially opposite the first non-perforated region. This region 124 may include an anti-ice exhaust vent for an anti-ice system for the nacelle 24. The first and/or the second non-perforated regions 122 and 124 may each extend circumferentially about the axis 36 between, for example, about twenty degrees (20°) and about sixty degrees (60°); e.g., about forty degrees (40°). In alternative embodiments, however, such non-perforated region may be omitted to provide active laminar flow control generally three-hundred and sixty degrees (360°) around the nacelle inlet 42.

The ALFC system 44 of the present disclosure, of course, is not limited to the exemplary configuration described above. For example, in some embodiments, there may be no perforations and, thus, active laminar flow control forward or aft of the aft bulkhead 64. In some embodiments, a plurality of plenums may be configured aft of the aft bulk head and/or at least one plenum may be configured forward of the aft bulkhead 64. In some embodiments, one or more sets of the plenums 98A-B, 99A-B, 100A-B may be fluidly coupled and/or integrated into a single circumferentially extending plenum. Such a plenum may extend, for example, between one-hundred and eighty degrees (180°) to completely around the axis 36. Of course, various other ALFC system configurations may be implemented with the nacelle inlet 42 of the present disclosure.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A nacelle for an aircraft propulsion system, comprising:
   an outer barrel; and
   an active laminar flow control system including a plurality of suction sources and a plurality of arrays of perforations in the outer barrel;
   wherein the active laminar flow control system is configured with a plurality of zones, and each of the zones includes a respective one of the suction sources which is fluidly coupled with a respective one of the arrays of perforations in the outer barrel.

2. The nacelle of claim 1, wherein the arrays of perforations in the outer barrel include a first array and a second array, and the first and the second arrays are arranged circumferentially about an axis of the outer barrel.

3. The nacelle of claim 1, wherein the arrays of perforations in the outer barrel include a first array and a second array, and the first and the second arrays are arranged along an axis of the outer barrel.

4. The nacelle of claim 1, wherein a first of the zones includes a plurality of plenums fluidly coupled with and between a first of the arrays of perforations in the outer barrel and a first of the suction sources.

5. The nacelle of claim 4, wherein the plenums are arranged along an axis of the outer barrel.

6. The nacelle of claim 4, further comprising a forward bulkhead and an aft bulkhead, wherein a first of the plenums is arranged axially forward of the aft bulkhead and a second of the plenums is arranged axially aft of the aft bulkhead.

7. The nacelle of claim 1, further comprising a forward bulkhead and an aft bulkhead, wherein a first of the zones includes a plenum fluidly coupled with and between a first of the arrays of perforations in the outer barrel and a first of the suction sources, and the plenum is aft of the aft bulkhead.

8. The nacelle of claim 1, wherein a first of the suction sources comprises an electric pump.

9. The nacelle of claim 1, further comprising a nacelle inlet which includes the outer barrel, wherein the active laminar flow control system is configured with the nacelle inlet.

10. The nacelle of claim 1, further comprising a nacelle inlet which includes the outer barrel, wherein a first of the suction sources is housed within the nacelle inlet.

11. The nacelle of claim 1, further comprising a nacelle inlet which includes the outer barrel, wherein a first of the suction sources is mounted to the nacelle inlet.

12. The nacelle of claim 1, wherein the outer barrel and the active laminar flow control system are operable to be connected to or disconnected from another component of the aircraft propulsion system as a single unit.

13. A nacelle for an aircraft propulsion system, comprising:
an outer barrel; and
an active laminar flow control system including a plurality of arrays of perforations in the outer barrel;
wherein the active laminar flow control system is configured with a plurality of zones, and each of the zones is configured to independently regulate airflow through a respective one of the arrays of perforations in the outer barrel.

14. The nacelle of claim 13, wherein the active laminar flow control system further includes a plurality of electric suction sources, and each of the zones includes a respective one of the suction sources which is fluidly coupled with a respective one of the arrays of perforations in the outer barrel.

* * * * *